United States Patent
Biswas et al.

(10) Patent No.: US 7,391,816 B2
(45) Date of Patent: Jun. 24, 2008

(54) DECODING UPSTREAM V.92-ENCODED SIGNALS

(75) Inventors: Ashim Biswas, Bangalore (IN); Uma Kishore S. V. Godavarti, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 821 days.

(21) Appl. No.: 10/666,206

(22) Filed: Sep. 17, 2003

(65) Prior Publication Data

US 2005/0058215 A1 Mar. 17, 2005

(51) Int. Cl.
*H04L 5/12* (2006.01)

(52) U.S. Cl. ............... 375/264; 375/286; 375/316; 375/340

(58) Field of Classification Search ........... 375/219, 375/222, 242, 254, 259, 260, 261, 264, 286, 375/295, 296, 316, 340, 298
See application file for complete search history.

(56) References Cited

U.S. PATENT DOCUMENTS

| | | | | | |
|---|---|---|---|---|---|
| 5,278,871 | A | * | 1/1994 | Rasky et al. | 375/343 |
| 5,416,801 | A | * | 5/1995 | Chouly et al. | 375/260 |
| 5,640,417 | A | * | 6/1997 | Barabash et al. | 375/222 |
| 5,953,376 | A | * | 9/1999 | Wei | 375/265 |
| 6,112,266 | A | * | 8/2000 | Yeh | 710/52 |
| 6,138,265 | A | * | 10/2000 | Morelos-Zaragoza et al. | 714/792 |
| 6,198,776 | B1 | | 3/2001 | Eyuboglu et al. | |
| 6,201,836 | B1 | | 3/2001 | Kim | |
| 6,317,419 | B1 | | 11/2001 | Olafsson et al. | |
| 6,418,170 | B1 | * | 7/2002 | Maurer et al. | 375/244 |
| 6,553,518 | B1 | * | 4/2003 | Ware et al. | 714/704 |
| 6,798,851 | B1 | * | 9/2004 | Dagdeviren | 375/340 |
| 2003/0039318 | A1 | * | 2/2003 | Tong et al. | 375/298 |
| 2004/0025102 | A1 | * | 2/2004 | Yokokawa et al. | 714/755 |

FOREIGN PATENT DOCUMENTS

| WO | WO 98/32257 | * | 7/1998 |
|---|---|---|---|
| WO | WO 98/32257 A1 | | 7/1998 |
| WO | WO 99/34566 A1 | | 7/1999 |

OTHER PUBLICATIONS

European Patent Office, International Search Report and Written Opinion for International Application No. PCT/US2004/030391, 14 pages, Dec. 9, 2004.
International Telecommunication Union, *Series V: Data Communication Over the Telephone Network—Simultaneous Transmission of Data and Other Signals—Enhancements to Recommendation V.90*, ITU-T Recommendation V.92, pp. 1-70, Nov. 2000.

* cited by examiner

*Primary Examiner*—Chieh M. Fan
*Assistant Examiner*—Naheed Ejaz
(74) *Attorney, Agent, or Firm*—Trop, Pruner & Hu, P.C.

(57) ABSTRACT

A decoder may include a constellation mapper arranged to receive a symbol and to determine two constellation points that are proximate the received symbol. An index mapper may determine a constellation index corresponding to the received symbol based on the received symbol and the two constellation points that are proximate the received symbol. A coset selector may receive successive constellation indices from the index mapper and may determine a number of nearest cosets to the successive constellation indices.

18 Claims, 5 Drawing Sheets

DECODING UPSTREAM V.92-ENCODED SIGNALS

BACKGROUND

The claimed invention relates to data communication and, more particularly, to decoding received data in data communication schemes.

Various schemes have been proposed to communicate data between devices. Devices that employ these schemes may communicate data at certain rates that are specified by these schemes with little or no additional configuration. Such communication schemes may encode data before transmission to protect the transmitted data against noise and/or other errors during transmission.

One scheme for transmitting encoded data may be found in the ITU-T V.92 (11/2000) recommendation. Devices that communicate in accordance with this V.92 recommendation, for example, may employ a pulse code modulation (PCM) scheme for upstream communication over a public switched telephone network (PSTN). Various sources of noise, however, may tend to corrupt the transmitted data, possibly leading to transmission errors and a lower overall data rate. Further, decoding schemes that reduce data corruption may be computationally expensive to implement.

BRIEF DESCRIPTION OF THE DRAWINGS

The accompanying drawings, which are incorporated in and constitute a part of this specification, illustrate one or more implementations consistent with the principles of the invention and, together with the description, explain such implementations. In the drawings.

DETAILED DESCRIPTION

The following detailed description refers to the accompanying drawings. The same reference numbers may be used in different drawings to identify the same or similar elements. Also, the following detailed description illustrates certain implementations and principles, but the scope of the claimed invention is defined by the appended claims and equivalents.

Figure 1:
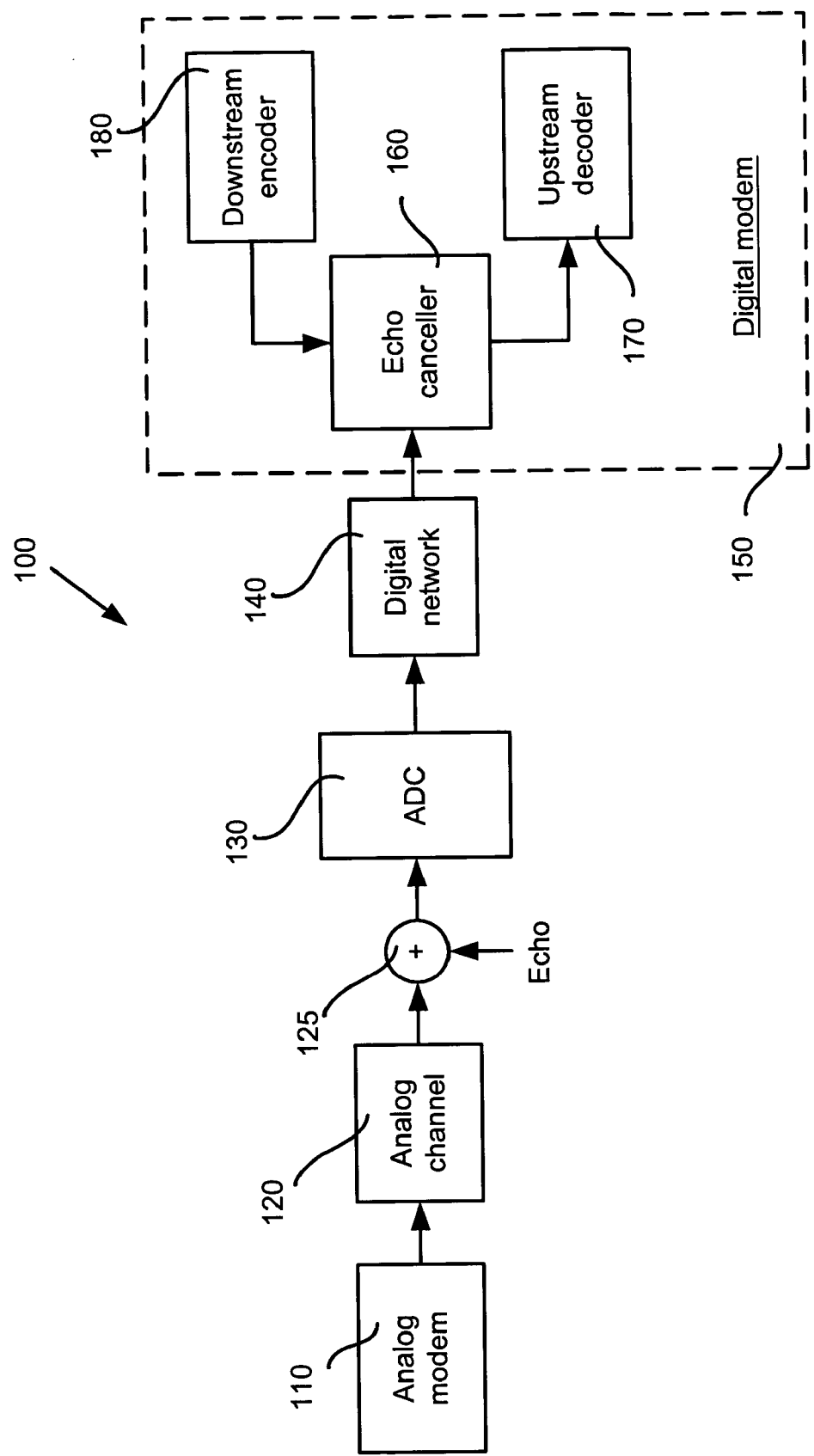
FIG. 1 illustrates an exemplary communication system in an implementation consistent with the principles of the invention.

FIG. 1 illustrates a communication system 100 in an implementation consistent with the principles of the invention. Communication system 100 may include an analog modem 110, an analog channel 120, an analog to digital converter (ADC) 130, a digital network 140, and a digital modem 150. System 100 may facilitate upstream data transmission from analog modem 110 to digital modem 150 over, for example, the PSTN. In system 100, for example, the PSTN may include one or more of analog channel 120 and digital network 140.

Analog modem 110 may be located at a user's premises and may be arranged to encode data bits to linear samples. Analog modem 110 may also be arranged to transmit the linear samples over analog channel 120. Analog modem 110 may be implemented, for example, as specified in the ITU-T V.92 (11/2000) recommendation, and may include a precoder and a pre-filter (not shown).

The precoder and a pre-filter in analog modem 110 may be adapted to mitigate the disruptive effects of analog channel 120 and/or digital network 140. Analog modem 110 may effect trellis coding of four-dimensional (4D) symbols, and may use similar constellation and trellis encoders to those consistent with the ITU-T V.34 (02/1998) recommendation. Analog modem 110 may output a points from a certain constellation that has been trellis encoded.

Figure 2:
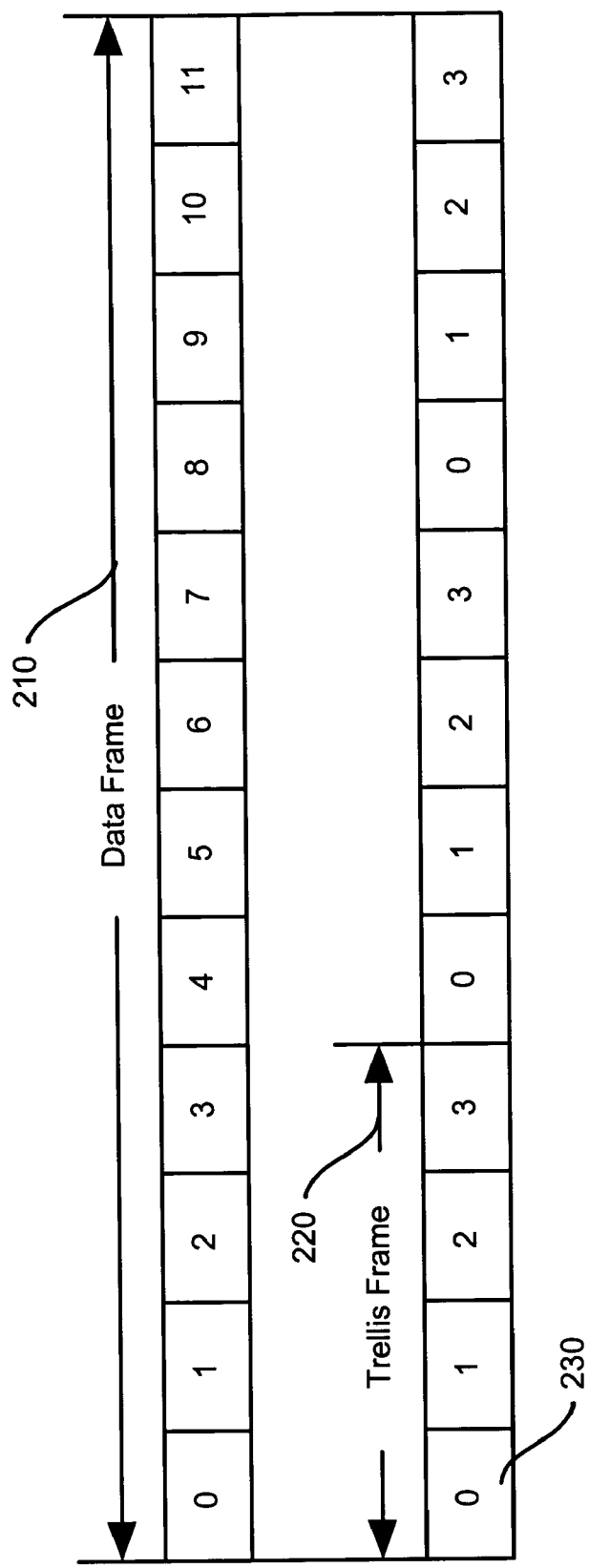
FIG. 2 illustrates exemplary data framing according to an implementation consistent with the principles of the invention.

FIG. 2 illustrates data framing that may be accomplished by analog modem 110. Analog modem 110 may encode data to be transmitted in the form of a data frame 210. In accordance with the V.92 recommendation, data frame 210 may be logically divided into two constellation frames of six symbols each (not shown) or three trellis frames 220 of four symbols each. One 4D trellis frame 220 may include four one-dimensional (1D) symbols 230 as illustrated in FIG. 2. After encoding the data, analog modem may output one or more data frames 210 to analog channel 120.

Returning to FIG. 1, analog channel 120 (e.g., a telephone line or local loop) may connect analog modem 110 with another networking location in system 100, such as a central office (CO). In addition to conveying the upstream data signal from analog modem 110, analog channel 120 may also introduce noise and/or other impairments to the signal. One type of added impairment may be an echo of the downstream signal to analog modem 110. Such echo addition may be schematically illustrated in FIG. 1 as a combiner 125, but it should be understood that such addition may be a typical by-product of analog channel 120 and/or the CO, and not due to a separate combiner device.

ADC 130 may be arranged to convert the analog signal from channel 120 to a corresponding digital signal for transmission over digital network 140 via PCM. In certain implementations, ADC 130 may be located in the CO. ADC 130 may receive linear data samples from analog channel 120 and may quantize them by u-Law or A-Law schemes. Other devices (not shown) may transmit the quantized data over the digital network 140 to digital modem 150.

Digital network 140, in addition to transmitting the digital signal, may further corrupt the signal with digital impairments such as those introduced by robbed bit signaling (RBS) and digital padding.

Digital modem 150 may receive the upstream digital signal from digital network 140. Digital modem 150 may include an echo canceller 160, an upstream decoder 170, and a downstream encoder 180.

Echo canceller 160 may receive corrupted samples from digital network 140. Echo canceller 160 may translate these corrupted samples to linear samples to remove the echo introduced by analog channel 120, and it may also remove digital impairments introduced by digital network 140. The output of the echo-canceller 160, a succession of symbols r(n), may be assumed to be free of any impairments due to digital network 140. Further, output of the echo-canceller 160, r(n), may ideally be one of the points from the constellation used transmission by analog modem 110. Due to noise in analog channel 120 and/or digital network 140, however, the symbols encoded in r(n) may not coincide exactly with the constellation points used by analog modem 110.

Figure 3:
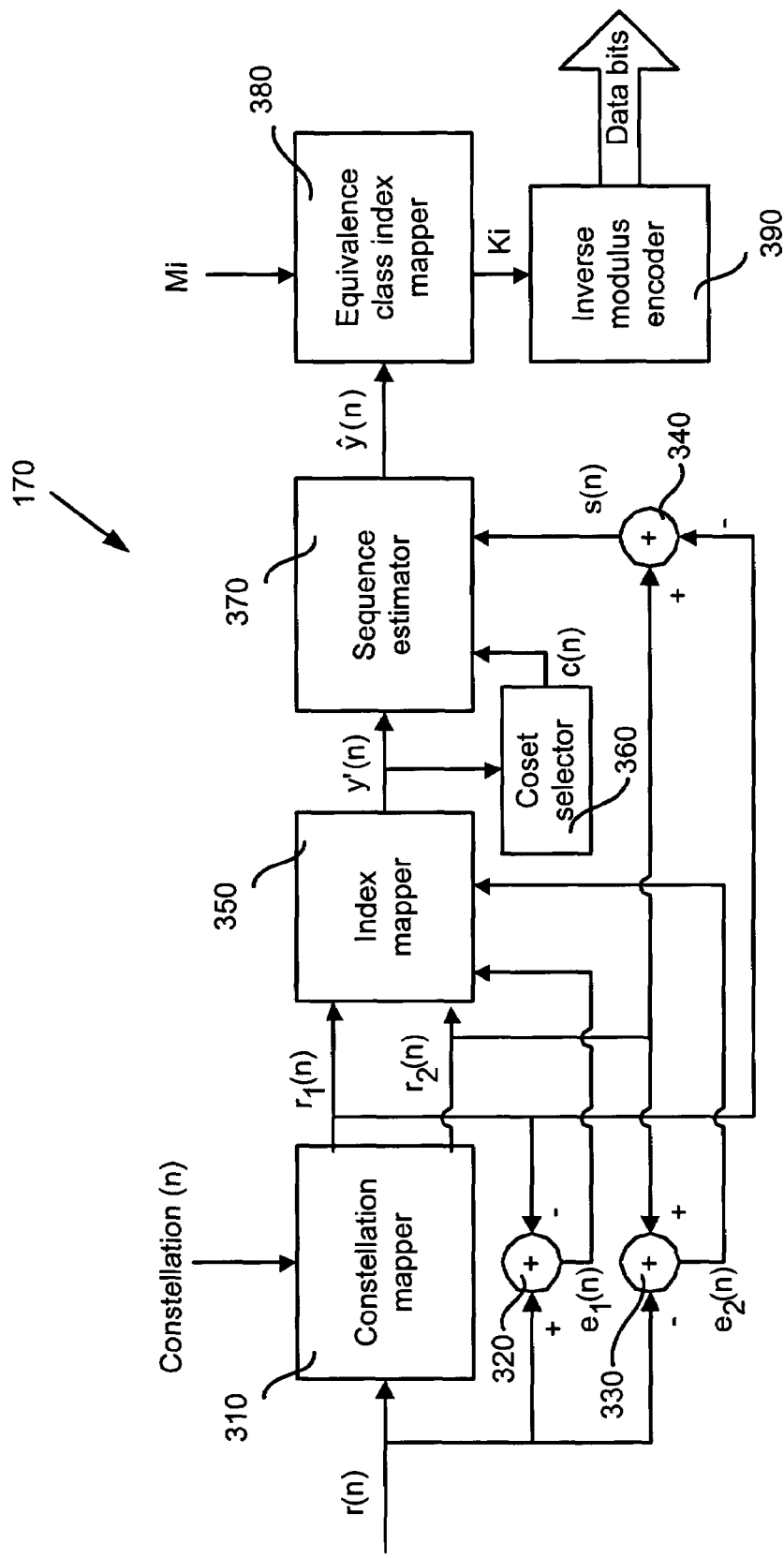
FIG. 3 illustrates an exemplary decoder in an implementation consistent with the principles of the invention.

FIG. 3 illustrates upstream decoder 170 in an implementation consistent with the principles of the invention. Decoder 170 may include constellation mapper 310, combiners 320-340, index mapper 350, coset selector 360, sequence estimator 370, equivalence class index mapper 380, and inverse modulus encoder 390. Decoder 170 may be implemented by hardware (e.g., field programmable gate array (FPGA), application specific integrated circuit (ASIC) cell, etc.), software/firmware and/or some combination of hardware and software. That portion of decoder implemented in software may be stored in computer-readable form in, for example, a memory (not shown) in digital modem 150. For ease of explanation, however, functional elements 310-390 will be described as though they were discrete elements, even though elements 310-390 may not actually be implemented as such.

Constellation mapper 310 may be arranged to receive a succession of 1D symbols, denoted by r(n), from echo canceller 160. Constellation mapper 310 may map the received 1D symbol to the nearest two constellation points $r_1(n)$ and $r_2(n)$ in the constellation that was used by analog modem 110. To aid in such nearest-point mapping, constellation mapper 310 may also refer to a stored constellation (or portion thereof), denoted Constellation(n) in FIG. 3.

Combiners 320-340 may be arranged to compute other values from the nearest two constellation points $r_1(n)$ and $r_2(n)$. Combiners 320-340 may arithmetically combine their inputs to produce a combined output. For the purposes of explanation, the received 1D symbol r(n) may be assumed to be related to these nearest points by: $r_1(n) r(n) r_2(n)$, although r(n) need not follow such a relationship (e.g., in a boundary case). Combiner 320 may calculate a first error magnitude $e_1(n)$ by subtracting $r_1(n)$ from r(n). Combiner 330 may calculate a second error magnitude $e_2(n)$ by subtracting r(n) from $r_2(n)$. Also, combiner 340 may calculate a scale factor s(n) by subtracting $r_1(n)$ from $r_2(n)$.

Index mapper 350 may receive the nearest constellation points $r_1(n)$ and $r_2(n)$ and their corresponding errors $e_1(n)$ and $e_2(n)$ and may find the index y'(n) of the received constellation point r(n). Index mapper 350 may be arranged to find the index y'(n) based on indices $y_1(n)$ and $y_2(n)$ that correspond to the nearest constellation points $r_1(n)$ and $r_2(n)$. Index mapper 350 may employ a number of schemes, possibly involving weighting by the errors $e_1(n)$ and $e_2(n)$, to find the index y'(n). It should be noted that some schemes (e.g., linear interpolation) may not necessarily require the errors $e_1(n)$ and $e_2(n)$, but other schemes (e.g., higher-order interpolation) may need these errors, so the errors $e_1(n)$ and $e_2(n)$ are shown as inputs to index mapper 350 in FIG. 3.

Figure 4:
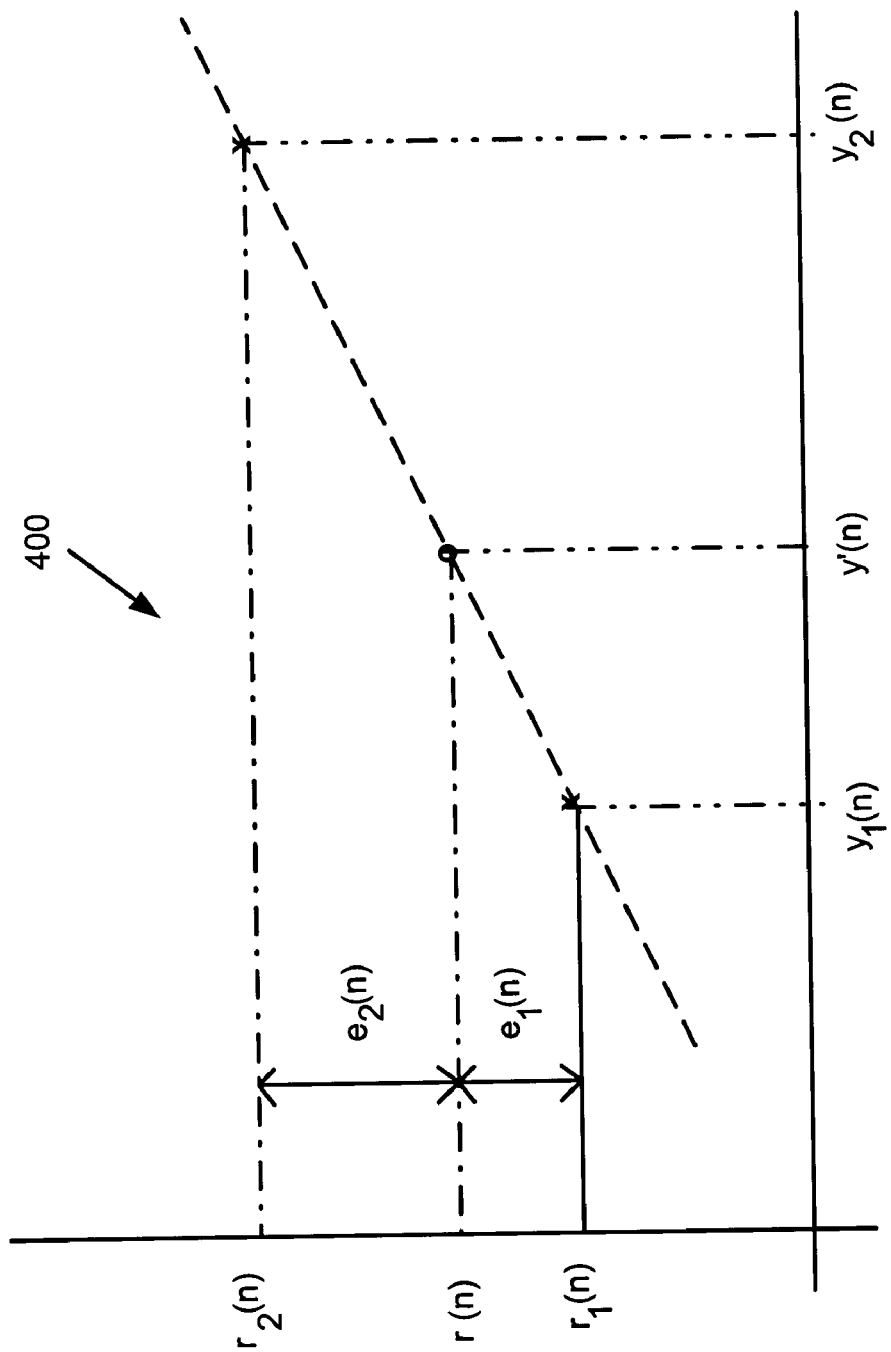
FIG. 4 illustrates an exemplary interpolation scheme consistent with the principles of the invention.

FIG. 4 illustrates an exemplary interpolation scheme 400 consistent with the principles of the invention. In scheme 400, the y-axis illustrates magnitudes of the nearest constellation points $r_1(n)$ and $r_2(n)$ and the x-axis illustrates the corresponding indices $y_1(n)$ and $y_2(n)$. Using linear interpolation between the points $(r_1(n), y_1(n))$ and $(r_2(n), y_2(n))$, and possibly using one or more of errors $e_1(n)$ and $e_2(n)$ to determine a point along the interpolation line, y'(n) may be determined. Although a linear interpolation scheme is shown in FIG. 4, other interpolation and/or spline techniques may be used, with or without one or more of errors $e_1(n)$ and $e_2(n)$, to determine y'(n), the index of the received constellation point r(n).

Returning to FIG. 3, coset selector 360 may be arranged to receive two consecutive calculated indices y'(n) and y'(n+1), form a 2D point, and determine the nearest number of cosets c(n). In conjunction with such coset determination, the two consecutive calculated indices y'(n) and y'(n+1) may be made odd-indexed (e.g., 2y'(n)+1 and 2y'(n+1)+1). Coset selector 360 may determine a nearest number of cosets c(n) ranging from about 4 to about 16 in number. In one implementation consistent with the principles of the invention, coset selector 360 may determine a nearest eight cosets c(n) to calculated indices y'(n) and y'(n+1). Coset selector 360 may label the cosets c(n) in accordance with, for example, the coset labeling scheme outlined in the ITU-T V.34 (2/1998) recommendation.

Sequence estimator 370 may receive a number of calculated indices y'(n), corresponding nearest cosets c(n), and corresponding scale factors s(n), and may be arranged to estimate a most likely trellis sequence (n) from these inputs. Sequence estimator 370 may be any of a number of maximum likelihood sequence estimation (MLSE) decoders, and in one implementation consistent with the principles of the invention, sequence estimator 370 may include a Viterbi decoder. Sequence estimator 370 may use the odd-indexed indices 2y'(n)+1 and 2y'(n+1)+1 and nearest cosets c(n) to calculate Euclidean distances of the odd-indexed constellation points from the projected received point r(n). These Euclidian distances may be scaled by the scale factor s(n) to normalize error metrics, and to generate a 4D trellis point (e.g., a sequence of four 1D points) (n).

Equivalence class index mapper 380 may map these 1D points (n) to indices $K_i$ of the equivalence class $E(K_i)$ from which these points were generated at analog modem 110. Equivalence class index mapper 380 may employ a parameters Mi (e.g., $M_0$ to $M_{11}$, communicated from analog modem 110 during startup) to aid in obtaining indices $K_i$. Twelve of these indices $K_i$ may define a data frame.

Inverse modulus encoder 390 may map indices $K_i$ to data bits in a typical manner. For example, it may perform the inverse of the modulus encoding specified in the V.92 recommendation.

Returning to FIG. 1, downstream encoder 180 may be arranged to encode downstream data in accordance with the ITU-T V.92 recommendation for transmission to analog modem 110.

Digital modem 150 may be employed as a stand-alone device. In other implementations, digital modem 150 may be included in a server computer including, for example, other communication interfaces (e.g., Ethernet), a storage device (e.g., a hard disk), an input/output (I/O) controller, etc.

Figure 5:
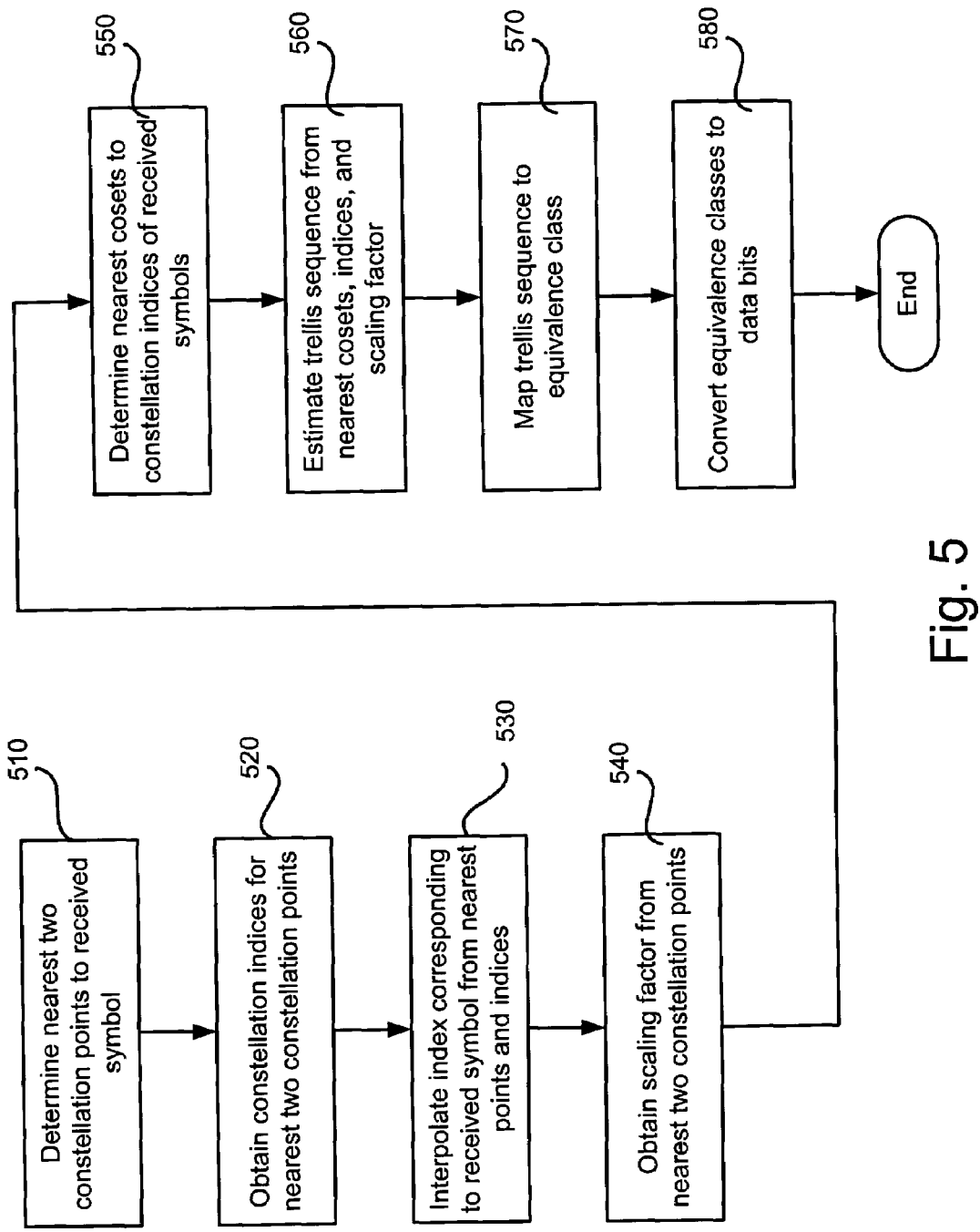
FIG. 5 is a flow chart illustrating a process of decoding received data according to an implementation consistent with the principles of the invention.

FIG. 5 is a flow chart illustrating a process of decoding received data r(n) according to an implementation consistent with the principles of the invention. The process may begin by finding the nearest two 1D constellation points $r_1(n)$ and $r_2(n)$ to each received symbol r(n) [act 510]. These nearest two constellation points may be chosen by constellation mapper 310 from the constellation corresponding to the current data interval and may satisfy the relation $r_1(n) \leq r(n) \leq r_2(n)$.

The process may continue by obtaining the constellation indices $y_1(n)$ and $y_2(n)$ corresponding to $r_1(n)$ and $r_2(n)$, respectively [act 520]. Index mapper 350 may map the nearest two constellation points $r_1(n)$ and $r_2(n)$ to their indices $y_1(n)$ and $y_2(n)$. A constellation index y'(n) corresponding to the received constellation point r(n) maybe interpolated using $r_1(n), r_2(n), y_1(n)$, and $y_2(n)$ [act 530]. Index mapper 350 may also obtain the error magnitudes $e_1(n)$ and $e_2(n)$ from the received symbol r(n) to the nearest constellation points $r_1(n)$ and $r_2(n)$ in the process of determining y'(n). Error magnitudes $e_1(n)$ and $e_2(n)$ may be obtained from combiners 320 and 330.

The process may continue by obtaining a scaling factor s(n) from the nearest two constellation points $r_1(n)$ from $r_2(n)$ [act 540]. In one implementation, combiner 340 may obtain s(n) by subtracting $r_1(n)$ from $r_2(n)$.

With two consecutive y'(n), coset selector 360 may form a 2D point and determine the nearest eight cosets to that 2D point [act 550]. The labeling of these selected cosets is in accordance with the coset labeling scheme set forth in the V.34 recommendation referenced above. It should be noted that fewer cosets (e.g., four) or more cosets (e.g., twelve) may be selected instead of eight, and may depend on the desired performance of the decoder versus complexity.

From these cosets and odd-indices (2y'(n)+1, 2y'(n+1)+1), sequence estimator 370 may obtain the distance metrics to all points in the cosets found in act 550, and may scale them by s(n). Using the Viterbi algorithm or any other maximum likelihood sequence estimation (MLSE) method, sequence estimator 370 may determine the valid trellis sequence [act 560]. From this trellis sequence, sequence estimator 370 may obtain the 4D point or four 1D points (n) corresponding to the trellis frame associated with the trellis sequence.

Equivalence class index mapper 380 may map these 1D points (n) to their corresponding equivalence classes Ki [act 570]. Twelve of these Ki's (e.g., corresponding to 3 consecutive trellis frames) may form a data frame. Inverse modulus encoder 390 may decode these Ki's to data bits using an inverse modulus encoding operation.

The foregoing description of one or more implementations consistent with the principles of the invention provides illustration and description, but is not intended to be exhaustive or to limit the claimed invention to the precise form disclosed. Modifications and variations are possible in light of the above teachings or may be acquired from practice of the invention.

For example, although some elements have been described as using odd-indices (2y'(n)+1, 2y'(n+1)+1), this need not necessarily occur. Normal indices, y'(n), y'(n+1), etc., may additionally or alternatively be used.

Moreover, the acts in FIG. 5 need not be implemented in the order shown; nor do all of the acts necessarily need to be performed. Also, those acts that are not dependent on other acts may be performed in parallel with the other acts. Further, the acts in this figure may be implemented as instructions, or groups of instructions, implemented in a computer-readable medium.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the claimed invention is defined by the claims and their equivalents.

What is claimed:

1. A decoder, comprising:
   a constellation mapper circuit to determine two constellation points that are proximate a received symbol;
   an index mapper circuit to determine a constellation index corresponding to the received symbol based on the received symbol and the two constellation points that are proximate the received symbol; and
   a coset selector circuit to receive successive constellation indices from the index mapper and to determine a number of nearest cosets to the successive constellation indices.

2. The decoder of claim 1, wherein the two constellation points are the nearest two points to the received symbol in a predetermined constellation of points.

3. The decoder of claim 2, wherein one of the two constellation points is less than or equal to the received symbol and another of the two constellation points is greater than or equal to the received symbol.

4. The decoder of claim 1, wherein the index mapper circuit is arranged to determine two constellation indices that correspond to the two constellation points and to determine the constellation index corresponding to the received symbol based on the two constellation indices that correspond to the two constellation points.

5. The decoder of claim 4, wherein the index mapper circuit is arranged to interpolate between the two constellation indices that correspond to the two constellation points based on the received symbol.

6. The decoder of claim 1, further comprising:
   combiners to generate at least one difference between the received symbol and at least one of the two constellation points that are proximate the received symbol,
   wherein the index mapper circuit further determines the constellation index corresponding to the received symbol based on the at least one difference.

7. The decoder of claim 1, wherein the coset selector circuit is arranged to determine about four or more nearest cosets to the successive constellation indices.

8. The decoder of claim 1, further comprising:
   a sequence estimator circuit connected to the index mapper circuit and the coset selector circuit and arranged to generate a sequence of trellis points based on the nearest cosets and one or more constellation indices corresponding to received symbols.

9. The decoder of claim 8, further comprising:
   an equivalence class index mapper circuit to generate equivalence class indices from the sequence of trellis points; and
   an inverse modulus encoder circuit connected to the equivalence class index mapper and arranged to generate data bits from the equivalence class indices.

10. A method of decoding data, comprising:
    determining two constellation points that are nearest a received symbol;
    combining the received symbol and at least one of the two constellation points to produce at least one difference value;
    identifying a constellation index corresponding to the received symbol based on the two constellation points and the at least one difference value; and
    determining at least four nearest cosets to successive constellation indices.

11. The method of claim 10, wherein the identifying includes:
    determining two constellation indices that correspond to the two constellation points; and
    interpolating between the two constellation indices based on the at least one difference value to identify the constellation index corresponding to the received symbol.

12. The method of claim 10, further comprising:
    calculating a scale value based on the two constellation points; and
    generating a sequence of points based on the at least four nearest cosets, the scale value, and constellation indices corresponding to received symbols.

13. The method of claim 12, further comprising:
    generating equivalence class indices from the sequence of points; and
    producing data bits from the equivalence class indices.

14. A computer readable medium including instructions, when executed by a computer, comprising:
    instructions for determining two constellation points that are nearest a received symbol, one constellation point of the two being greater than or equal to the received symbol and another constellation point of the two being less than or equal to the received symbol;

instructions for identifying two constellation indices that correspond to the two constellation points;

instructions for interpolating between the two constellation indices to produce a constellation index corresponding to the received symbol; and instructions for determining a number of nearest cosets to a pair of successive constellation indices corresponding to received symbols.

15. The medium of claim 14, further comprising:

instructions for combining the received symbol and the two constellation points to produce difference values, wherein the instructions for interpolating use the difference values to produce the constellation index.

16. The medium of claim 14, further comprising:

instructions for generating a sequence of points based on the number of nearest cosets and constellation indices corresponding to received symbols.

17. The medium of claim 16, further comprising:

instructions for converting the sequence of points to equivalence class indices; and instructions for decoding the equivalence class indices to generate data bits.

18. A system, comprising:

a constellation mapper arranged to receive a symbol and to determine two constellation points that are proximate the received symbol, and an index mapper arranged to determine a constellation index corresponding to the received symbol based on the received symbol and the two constellation points that are proximate the received symbol;

a hard disk proximate the constellation mapper; and a coset selector to receive successive constellation indices from the index mapper and to determine a number of nearest cosets to the successive constellation indices.

* * * * *